United States Patent Office 3,485,594
Patented Dec. 23, 1969

3,485,594
MOLTEN IRON METHOD OF RECOVERING NUCLEAR MATERIAL FROM COMPOSITE BODIES
Ottmar Knacke, Aachen, Germany, assignor to Kernforschungsanlage Juelich des Landes Nordrhein-Westfalen-e.V., Juelich, Germany
No Drawing. Filed Dec. 6, 1967, Ser. No. 688,337
Claims priority, application Germany, Dec. 12, 1966, K 60,909
Int. Cl. G21f 9/00; B03b 1/00
U.S. Cl. 23—324
16 Claims

ABSTRACT OF THE DISCLOSURE

Nuclear material such as nuclear fuel and breeder material is recovered from composite bodies comprising such nuclear material and a metallic or carbonaceous cover member, generally a ferrous or graphite cover member, which at least partially covers the nuclear material, by contacting the composite body with molten metal, preferably molten ferrous metal in which the cover member is soluble so that the cover member will be dissolved in the molten metal, and separating the nuclear material from the solution of the material of the cover member in the molten metal.

BACKGROUND OF THE INVENTION

The present invention is concerned with the working up of nuclear elements such as fuel elements or breeder elements in which the nuclear material is at least partially surrounded by a covering of metal, graphite or carbides and also the working up of coated nuclear particles such as particles or breeder or fuel materials.

The purpose of working up fuel or breeder elements is to separate as yet unspent fission and breeder materials or nuclear materials which were produced in the reactor from structural or cover members and from undesirable fission products.

In many cases, the fission product or breeder material is located in a metal covering formed, for instance, of steel or zirconium alloys such as Zirkaloy, or a graphite. In such cases it is necessary to destroy the covering or the like by mechanical or chemical means or, so to say, to peel it off. Such working up of fuel or breeder elements becomes also necessary if the elements are unusable due to faults in the production thereof or if the elements were damaged in the reactor.

According to conventional methods for working up fuel and breeder elements, metallic coverings are mechanically removed or dissolved in acids. Graphitic coverings are burned off or ground or also destroyed by chemical or electrochemical means.

It is a disadvantage of these methods that the mechanical removal of the cover material, for instance by means of cutting tools, is subject to difficulties interfering with smooth operation particularly because it is generally required to carry out this work in hot cells by means of remotely controlled tools.

If the cover is to be removed by dissolution in acids, problems arise due to contamination with volatile fission products. Furthermore, the aqueous solutions are contaminated with metals derived from the cover material and possibly from other structural elements.

Removal of graphite by burning is connected with the disadvantage that the waste gases which are formed thereby are contaminated with volatile fission products, particularly krypton or tritium and it is difficult to remove these fission products from the waste gases.

Furthermore, the storage and disposal of the radioactive final solutions accruing by working up the fuel elements or the like with aqueous solutions, requires involved and expensive measures for binding or fixing of the radioactive fission products contained therein. This requires, for instance, very costly evaporation followed by calcination in a fluidized bed furnace or the like. It has also been proposed to work up such fuel elements or the like by metallurgical means and thereby to practically eliminate mechanical processing. For instance, metallic fuels consisting of uranium and plutonium and the fission products formed thereof are molten in a crucible of zirconium dioxide whereby volatile fission products such as noble gases, cesium and iodine as well as others are volatilized whereas the oxidizable components of the molten alloy are oxidized and thereby removed from the metal. The thus-treated metal is sufficiently decontaminated so that the alloy, after casting, may again be inserted into the reactor, whereby the required length of time from removal of the fuel elements from the reactor up to their reuse will amount only to a few days.

According to another method, fuel elements of metallic uranium and including coverings of magnesium alloys are molten and the fission products derived from the uranium are extracted by means of a second liquid metal phase. This melting process also will result in substantial decontamination by volatilization. It is an advantage of the last-mentioned method that the fission products which are thereby volatilized can be easily caught and stored. However, this method can be used only if the fuel is present in metallic form. Nuclear fuels and breeder materials in the form of chemical compounds cannot be recovered in this manner.

It is therefore an object of the present invention to provide a method for the working up of fuel and breeder elements and of coated particles of nuclear materials, which method does not require any substantial mechanical pretreatment, and will be connected with volatilization of volatile fission products from the liquid solution combined with binding of the non-volatile fission products in a storable manner and separation of the valuable fuel and breeder materials in the form of their substantially decontaminated oxides.

SUMMARY OF THE INVENTION

According to the present invention, nuclear material such as nuclear fuel and breeder material or particles of nuclear material are separated from structural and covering members or coatings of metal or graphite by dissolution of such non-nuclear constituents in molten ferrous metal such as iron or steel. The nuclear material if present in a form which is soluble in the molten metal will be simultaneously dissolved therein and thereafter separated therefrom by conversion of the nuclear material into oxides which are insoluble in the molten metal. Such oxides will form a solid or liquid slag which can be easily separated from the solution of the covering in the molten metal. However, in many cases, the nuclear material will, ab initio, be present in a form which is insoluble in the molten metal and in such case no oxidation of the nuclear material will be required and the latter will separate from the solution of the covering material in the molten metal due to its different specific gravity. Recovery of the thus-operated nuclear material or nuclear slag may then be carried out in conventional manner, for instance by decantation.

DESCRIPTION OF THE PREFERRED EMBODIMENTS

According to the present invention, fuel and breeder elements in which the fuel or breeder material is surrounded or partially covered with metal, graphite or carbides, or fuel or breeder particles which are coated with metal, graphite or carbides, are recovered by at least partial dissolution of the elements or coated particles in molten metal in which the covering or coating is soluble, so that the insoluble or difficultly soluble fuel or breeder material, which will be of different specific gravity than the molten metallic solution, can be easily withdrawn from the latter.

It is particularly advantageous to use for the purposes of the present invention a ferrous metal as the solvent. Thereby, it is entirely possible to utilize for this purpose commercial iron, pig iron, steel scrap or the like. In the present specification and claims the term "iron" is intended to denote the various forms of commercially available iron such as cast iron, pig iron, steel and the like, as well as pure iron.

The choice of the molten metal which is to serve as solvent will depend on the type of fuel or the like element which is to be at least partially dissolved, i.e., on the specific composition of the covering or coating which is to be dissolved, possibly under simultaneous dissolution of the nuclear material. Thus, for instance, it is advantageous to use molten steel scrap as a solvent if graphite coverings or coatings or structural elements consisting of graphite have to be dissolved.

According to one embodiment of the present invention, the fuel or breeder elements or the coated nuclear particles are first introduced into the covering or container formed of iron, and thereafter the container or the like and its contents are subjected to a temperature sufficiently high to cause melting of the iron container. This may be carried out, for instance, in a high frequency electric furnace.

In accordance with another and frequently advantageous embodiment of the present invention, the fuel or breeder elements or the coated nuclear particles are introduced into a bath of molten iron.

It is particularly advantageous to use iron (in the broad sense denoted above) as the solvent, in view of its general availability, relatively low cost, and because the solidified iron with the fission products contained therein may be stored without difficulty.

It is a further advantage of molten iron as the solvent that metallic coverings, as well as graphite elements and coatings of pyrolytic carbon and SiC will be quickly dissolved in liquid iron.

Gaseous fission products which are freed upon dissolution or partial dissolution of the fuel or breeder elements or of the coated nuclear particles, such as cesium, iodine, tritium, various noble gases and the like may be retained on conventional filters or pumped off.

The metallic or graphite covering of the nuclear fuel retain gaseous products formed by fission, for instance, noble gases. If the more or less spent fuel element is contacted with the molten iron, the covering is dissolved and the up-to-now retained gaseous fission products are freed and reach the gas space above the melt. If, for instance, the melt is maintained in a vacuum furnace, it is possible to hold the fission gases in an adsorber, for instance a bed of carbon particles actively cooled with liquid air and located between the furnace and the operating vacuum pump. In this manner it is possible to retain the fission gases in concentrated form.

If the fuel or breeder material of the fuel or breeder element or the nuclear material of the coated nuclear particles is soluble in the molten metal, as in the case, for instance, with metallic uranium or uranium carbide, it will be advantageous to introduce into the molten iron bath iron oxides or other, per se known, oxidizing agents, or air, molecular oxygen, carbon dioxide or water (steam) is blown onto the surface of the iron bath or into the latter.

In this manner it is possible, without difficulty, by selective oxidation to separate the fuel and breeder materials together with elements having a high affinity for oxygen, such as the rare earths, whereas the nobler metals and carbon will remain in the metallic phase, i.e., in the molten iron bath, in a manner similar to that well known in steel refining. Thereby, in accordance with the present invention, in a manner known per se, a solid or liquid slag is formed and it is sometimes advantageous to introduce into the slag conventional fluxing agents.

If the fuel or breeder elements or the coated particles contain graphite as the non-nuclear material, for instance as structural elements, so that upon contact with the molten iron bath the carbon content of the molten iron is progressively increased, it will be advantageous to remove a portion of the dissolved carbon by oxidation and thereby to reduce the carbon concentration of the molten bath making the latter capable of dissolving additional quantities of graphite. By proceeding in this manner there is the advantage that the waste gases produced thereby which primarily consist of carbon monoxide and carbon dioxide will not be contaminated with dangerous volatile fission products since the latter were already volatilized and precipitated during the preceding dissolution of the fuel elements or the like.

Since it is thus possible, in accordance with the present invention, to re-use the iron of the molten bath, the loss of breeder and fuel material which, due to their—although relatively small—solubility, cannot be completely avoided, will be reduced to an economically bearable extent.

The method of the present invention is therefore particularly advantageous in connection with the working up of fuel and breeder elements in which the fuel or breeder material is located in a graphite covering or in which nuclear particles are coated with a layer of pyrolytic carbon, i.e., a dense carbon layer formed by thermal decomposition of gaseous hydrocarbons at a hot surface. If necessary, it is possible without difficulty to dissolve in the iron bath graphite moderators or structural elements of graphite such as reactor cores. Thereby, the carbon is first dissolved in molten iron, and then volatilized as decontaminated oxide. It is is of course also possible to dissolve in the iron bath metallic structural elements of the reactor core.

When utilizing the method of the present invention in connection with oxidic fuel and breeder materials, the advantage is achieved that the coverings or coatings will be dissolved, whereas the oxidic fuel or the like particles remain unchanged and separate from the molten metal face.

It is a particularly important advantage of the present method that the difficulties which were experienced up to now in connection with the storage of the radioactive waste material accruing in the working up of fuel elements, will be practically completely eliminated, since it is possible without difficulty to store the solidified used iron bath without taking any additional precautionary steps.

The nuclear material which is separated in accordance with the present invention may accrue initially as a mixture of oxides in the form of slag or in pulverulent form. The thus-obtained product may be futrher worked up in conventional manner, either wet or dry, and the specific manner of further processing will depend on the intended use of the thus recovered nuclear fuel and the like.

The following examples are given as illustrative only without, however, limiting the invention to the specific details of the examples.

Example I

Commercial scrap iron is molten in an argon atmosphere in a crucible of refractory material, for instance a crucible made of alumina. The melt is maintained at a temperature of about 1600° C. and fuel element rods comprising a cover of stainless steel and a core of uranium dioxide are introduced into the melt. The metal cover of the rod is quickly dissolved in the molten iron, whereas the uranium dioxide, which is insoluble in the molten iron, settles at the bottom and is recovered by decantation of the supernatant molten iron.

Example II

The method of the present invention may be carried out for the recovery of fuel from fuel elements for gas-cooled high temperature reactors.

In this case, scrap iron is molten in a crucible, as described in Example I. The fuel elements in this case comprise solid graphite spheres of about 5 cm. diameter in which are embedded uranium dioxide particles coated with pyrolytically deposited carbon and having diameters of about 350 microns.

The ratio of carbon to metallic uranium is about 200:1. The entire carbon of the fuel elements is dissolved in the molten iron without difficulty up to a carbon concentration of 5.35% by weight at a melt temperature of 1550° C., in other words, the carbon will be dissolved up to saturation of the iron melt. This means that the carbon of the graphite spheres as well as the carbon of the coating of the individual fuel particles will be dissolved. The oxidic fuel particles will collect at the surface of the molten bath and will be withdrawn therefrom in conventional manner.

Example III

It is, of course, also possible to dissolve in a molten iron bath uranium dicarbide particles which were coated with carbon. In this case, as described in the previous examples, it is advantageous to melt commercial scrap iron in an argon atmosphere, for instance in an alumina crucible, and to introduce the fuel elements at a bath temperature of about 1550° C. Again, the coating of the graphite cores or granules will be nearly immediately dissolved up to a carbon concentration of the iron bath of 5.35% by weight at a bath temperature of 1550° C.

Example IV

In order to separate metallic uranium, for instance uranium which in accordance with Example III has been introduced in the form of uranium carbide, it is advantageous to proceed as follows:

Molten iron containing about 5 parts by weight of uranium is heated in an alumina crucible to a temperature of 1550° C.

A mixture of $H_2$ and $H_2O$, with partial pressure ratio of $p_{H_2}:p_{H_2O}=727:33$, is blown at a total pressure of 1 atmosphere onto the surface of the molten iron solution.

It will be found that after blowing for two hours more than 60% of the uranium content in the molten iron has been oxidized to $UO_2$. The thus formed $UO_2$ collects, free of iron oxide, at the surface of the molten iron bath and may be withdrawn therefrom in per se conventional manner.

Example V

Uranium may also be separated from the molten iron bath in the following manner:

A molten iron bath containing about 3.5% by weight of carbon and 2.5% uranium is heated in an alumina crucible to a temperature of 1500° C. Gaseous nitrogen of highest purity is blown onto the molten bath so as to cause intensive stirring of the latter. After continuing the blowing for about 15 minutes, the uranium content of the melt will have been reduced to about 3.3% by weight and nitrated uranium, $U_2N_3$, will have collected at the surface of the molten iron bath and may be withdrawn from there in conventional manner.

The oxides or nitrides which are withdrawn in accordance with Examples IV and V may be freed of adhering residual iron or iron oxide by washing with aqueous hydrochloric acid or by chlorinating at temperatures below 250° C., and may thereafter be introduced into a conventional wet recovery process, for instance the process known as the "Thorex Process."

Example VI

In order to decarburize the molten iron bath, $CO_2$ may be blown onto a molten iron bath containing, for instance, 3.5% by weight carbon and being maintained at a temperature of 1500° C.

Dissolved carbon will be oxidized thereby in accordance with the equation $C+CO_2=2CO$, and in about 15 minutes the molten iron bath will be decarburized to a residual carbon content below 0.2% by weight.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. Method of separating nuclear material such as nuclear fuel and breeder material from a composite body consisting essentially of said nuclear material and a metallic or carbonaceous clad at least partially covering said nuclear material and capable of being dissolved in molten ferrous metal, comprising the steps of contacting said composite body with molten ferrous metal so as to dissolve at least said clad in said molten metal; and separating said nuclear material from the thus formed solution of said clad in said molten ferrous metal.

2. A method as defined in claim 1, wherein said nuclear material is selected from the group consisting of metallic uranium, plutonium and compounds thereof.

3. A method as defined in claim 1, wherein said nuclear material is incapable of forming intermetallic compounds with iron.

4. A method as defined in claim 1, wherein said nuclear material is selected from the group consisting of uranium and uranium compounds.

5. A method as defined in claim 4, wherein said uranium compound is uranium oxide.

6. A method as defined in claim 1, wherein said clad consists essentially of carbonaceous material.

7. A method as defined in claim 1, wherein said clad consists essentially of ferrous metal.

8. A method as defined in claim 7, wherein said ferrous metal is selected from the group consisting of iron and steel.

9. A method as defined in claim 1, wherein said nuclear material is insoluble in said molten metal.

10. A method as defined in claim 1, wherein said nuclear material is soluble in said molten metal and is convertible into a form which is insoluble in said molten metal, so that upon contacting of said composite body with said molten metal said nuclear material is dissolved, and including the step of converting the thus dissolved nuclear material into an insoluble form prior to recovery thereof from said molten metal.

11. A method as defined in claim 10, wherein said dissolved nuclear material is converted into an insoluble form by oxidation with an oxidizing agent selected from the group consisting of $O_2$, $CO_2$ and $H_2O$, thereby forming a slag consisting essentially of an insoluble oxide of said nuclear material; and including the step of withdrawing the thus formed nuclear slag from said molten metal.

12. A method as defined in claim 10, wherein said soluble nuclear material consists essentially of elementary uranium and is convertible into an insoluble oxide, and wherein said converting of the dissolved elementary nuclear material into an insoluble form is carried out by oxidation with an oxidizing agent capable of preferentially oxidizing said uranium.

13. A method as defined in claim 1, wherein said composite body is introduced into a ferrous container, followed by heating to at least the melting point of said ferrous container so as to form at least a portion of said molten ferrous metal thereof.

14. A method as defined in claim 1, wherein said composite body is introduced into molten ferrous metal.

15. A method as defined in claim 1, wherein said clad consists essentially of graphite and said molten ferrous metal has a carbon content below the saturation point of dissolved carbon in said molten ferrous metal so that said molten ferrous metal is capable of dissolving said carbonaceous clad.

16. A method as defined in claim 15, wherein a portion of the carbon content of the molten ferrous metal is removed by oxidation so as to maintain the carbon content of the molten metal below its saturation point.

References Cited

FOREIGN PATENTS 1,438,507  4/1966  France.

OTHER REFERENCES

Lawroski et al.: Development of Liquid Metal and Salt Processes, Reactor Fuel Processing, vol. 7, #3, 190–1, July 21, 1964.

Lawroski et al.: Fundamental Studies of Liquid Metal and Salt Systems, Reactor Fuel Processing, vol. 4, #4, p. 39, October 1961.

Lawroski et al.: Development of Liquid Metal and Salt Processes, Reactor Fuel Processing, vol. 5, #3, p. 32–3, July 1962.

CARL D. QUARFORTH, Primary Examiner

M. J. McGREAL, Assistant Examiner

U.S. Cl. X.R.

23—344, 355